March 26, 1963 W. N. POUNDSTONE 3,082,860
TROUGHING IDLER ROLLER ASSEMBLY FOR BELT CONVEYORS
Filed Feb. 16, 1960
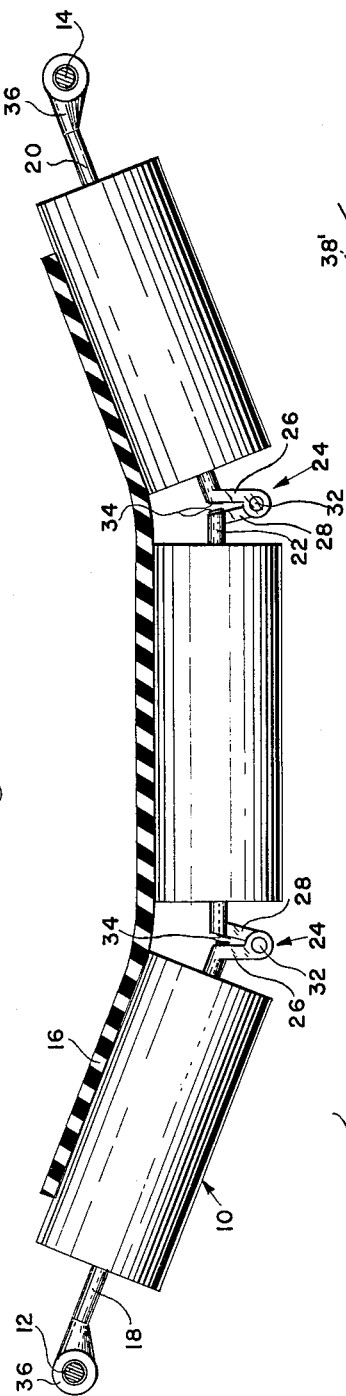
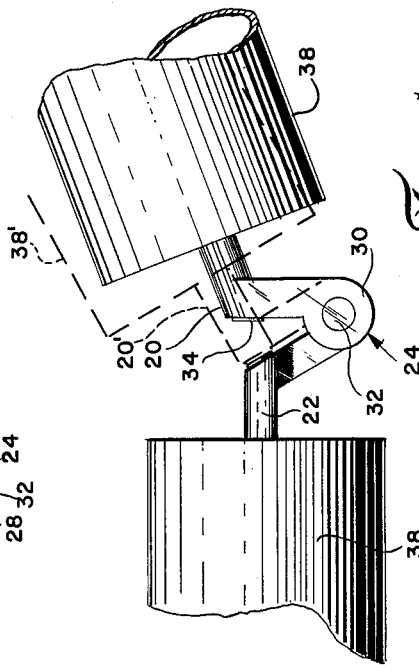
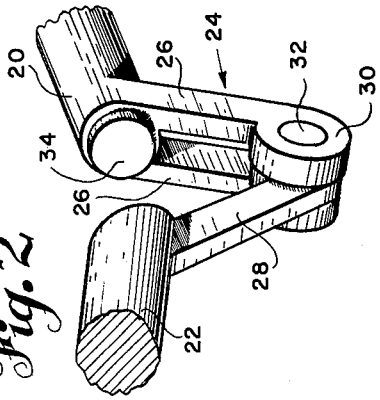
INVENTOR.
WILLIAM N. POUNDSTONE
BY Stanley J Price
his ATTORNEY

United States Patent Office 3,082,860
Patented Mar. 26, 1963

3,082,860
TROUGHING IDLER ROLLER ASSEMBLY FOR BELT CONVEYORS
William N. Poundstone, Morgantown, W. Va., assignor to Christopher Coal Company, Osage, W. Va., a corporation of West Virginia
Filed Feb. 16, 1960, Ser. No. 9,077
3 Claims. (Cl. 198—192)

This invention relates to troughing idler rollers which are utilized to support the troughed conveying reach of an endless conveyor belt, and more particularly to improved idler roller assemblies for flexible side frame supported belt conveyors.

The conventional endless belt conveyor consists of a belt supported by a series of idler rollers. The belt is driven by a belt drive means. The belt has a troughed conveying reach supported in a generally horizontal manner by a series of troughing idler rollers. The conveying reach carries the material to be transported by the conveyor belt. The conveyor belt has a return reach supported in a generally horizontal manner, usually below the conveying reach, by a series of return reach idler rollers. The return reach returns the empty portion of the belt to the belt drive to form a continuous path for the endless conveyor belt.

In recent years belt conveyors have been constructed in which a pair of flexible side frames are trained along a conveying course to support the conveyor belt. The flexible side frames are usually formed of wire rope or the like, and are supported at intervals by side frame supporting means such as vertical side frame supporting stands. The spaced side frames extend in a generally parallel manner along the conveying course. Idler rollers span the side frame members to support the conveying reach of a belt conveyor.

Flexible side frame belt conveyors have many advantages which make them popular in the mining industry. Among these advantages, flexible side frame conveyors are easily erected and disassembled for movement. Certain types of flexible side frame conveyors also provide an inherent belt training action which is valuable in belt conveyors. An example of an improved type of flexible side frame supported belt conveyor may be found in my copending United States patent application Serial No. 690,684, filed on October 17, 1957.

In flexible side frame supported belt conveyors, the force exerted by the load on the conveyor belt conveying reach is transferred through the transversely extending idler rollers which support the conveying reach to the flexible side frames of the conveyor. Since the idler rollers are connected to the flexible side frames, this transfer of force causes the idler roller assemblies of a flexible side frame supported belt conveyor to react somewhat differently than the idler roller assemblies of rigid side frame supported conveyors as will be discussed in the following paragraphs.

In most material carrying belt conveyor systems, the conveying reach of the belt conveyor is troughed to retain the conveyed material. It is recognized as desirable to have the trough of the conveying reach deepen somewhat when the load on the conveying reach is increased so that a greater volume of material may then be retained on the belt. In the early flexible side frame supported conveyor systems, troughing idler rollers with flexible shaft members were utilized to support the belt conveying reach. By flexible shaft members are meant both shaft members formed of flexible material such as wire rope and shaft members formed of sections of rigid material joined by pivot pins or hinged joints. The term is intended to encompass any shaft member which is not a rigid unit from end to end. These flexible shafted idler roller assemblies usually hung in approximately a catenary curve between two flexible side frame members of the conveyor system. As the load on the conveying reach of the belt conveyor was increased, the trough of the conveying reach deepened because the flexible shafted idler rollers permitted the catenary curve to change shape. The deepening of the trough of the conveying reach was also effected by the fact that the flexible side frame members of the conveyor system moved toward each other in the vicinity of the transversely extending idler roller assemblies. This inward movement of the flexible side frames of the conveyor system had the effect of shortening the span which the flexible shafted roller assemblies bridged. Although a certain amount of trough deepening under load is desirable, excessive deepening of the troughed conveying reach of the belt conveyor often occurred when the conveying reach of a flexible side frame suported conveyor was heavily loaded.

To overcome the excessive deepening of the trough of the conveying reach, rigid spreader members were made a part of the troughing idler roller assemblies that spanned the distance between the generally parallel flexible side frames of the conveyor system. The idler rollers were still formed with flexible shafts, but the distance between the flexible side frame members was rigidly fixed at the idler roller assembly by the spreader members. While the spreader members prevented excessive deepening of the trough of the conveyor conveying reach, they changed some of the advantageous characteristics of flexible side frame conveyors.

One of the advantageous characteristics of flexible side frame conveyors which was changed by the spreader member was the inherent ability of the flexible side frames to maintain the flexible shafted idler roller assembly in contact with the belt conveying reach under all conditions of belt loading. For example, when a flexible shafted idler roller without a rigid spreader member was utilized in a flexible side frame conveyor and when the conveying reach of the belt was lightly loaded, the flexible side frames exerted tension on the flexible shafted idler roller assembly so that the trough of the idler roller assembly became more shallow and the idler roller was maintained in contact with the under side of the belt throughout the entire width of the belt. When the load on the conveying reach was increased, the trough of the flexible shafted idler roller assembly deepened by drawing the flexible side frame members more closely toward each other.

When the spreader member was added to the flexible side frame supported conveyor system, the distance between the flexible side frame members was fixed at the roller assembly. Accordingly, when the conveying reach of the belt was relatively lightly loaded, the conveyor belt conveying reach tended to flatten so that it rode up out of the trough of the idler roller assembly. In such a situation, only the edges of the belt conveying reach contacted the idler rollers so that there was excessive conveyor belt wear along the edges of the belt. When the spreader members fixed the distance between the flexible side frames, the ability of the flexible side frame conveyor to maintain the flexible shafted idler roller in contact with the belt conveying reach throughout the width of the belt conveying reach no longer existed.

Another advantage of flexible shafted idler rollers is the fact that they may easily be shipped and stored with little danger of shaft deformation and shaft breakage. Further, the flexible shafted idler rollers can often be disassembled into relatively short lengths so that they may more easily be shipped and stored.

When it became necessary to utilize spreader members with the flexible side frame conveyors, this ease of handling characteristic of the idler roller assemblies was often lost. The spreader members were rigid structural elements which were long enough to span the distance between the flexible side frames of the conveyor system. It became the practice to assemble the idler rollers and the spreader members as a unit and not to disassemble them. Accordingly, a spreader member and an idler roller, when assembled as a unit, made a bulky, difficult to handle conveyor system element.

The present invention contemplates a form of idler roller assembly that provides the aforementioned advantages of flexible shafted idler roller assemblies when utilized without spreader members in the flexible side frame supported belt conveyor systems but which eliminates the excessive troughing of the belt conveyor reach that originally initiated the use of rigid spreader members.

To accomplish these desirable results, the present invention provides an idler roller assemby which is completely flexible within the normal range of belt conveying reach loading conditions, but which inhibits the excessive troughing of the belt conveying reach when additional loads are placed upon the conveying reach.

In operation, the idler roller assembly of the present invention permits deepening of the belt conveyor belt conveying reach trough by permitting the flexible side frame members of the conveyor system to be drawn toward each other as the belt conveying reach load increases. After the flexible side frames move together to within a minimum distance of each other, their further movement toward each other is inhibited by the idler roller construction of the present invention.

With the foregoing considerations in mind, it is a primary object of the present invention to provide an improved idler roller assembly.

Another object of this invention is to provide an improved troughing idler roller assembly for a flexible side frame supported belt conveyor.

Another object of the present invention is to provide an idler roller assembly for a flexible side frame supported belt conveyor which produces the advantages of a flexible shafted idler assembly, but which eliminates excessive troughing of the belt conveying reach.

Another object of the present invention is to provide an idler roller assembly which eliminates the requirement for separate, rigid spreader members when utilized with flexible side frame supported belt conveyors.

Another object of the present invention is to provide idler roller assemblies which may be compactly and safely packed for shipping and storage.

These and other objects of this invention will become apparent as this description proceeds in conjunction with the accompanying drawings:

In the drawings.

FIGURE 1 is an elevational view of one embodiment of the present invention.

FIGURE 2 is a fragmentary perspective view on an enlarged scale of the shaft hinge of the embodiment of FIGURE 1.

FIGURE 3 is a partial elevation on an enlarged scale showing the relative positions of two of the cylindrical rollers of the embodiment of FIGURE 1.

Referring now to FIGURES 1–3 there is shown an idler roller assembly generally designated 10. The idler roller assembly 10 extends transversely between two longitudinally extending flexible side frame members 12 and 14. The flexible side frame members 12 and 14 are constructed of wire rope or the like and are trained along a conveying course.

The troughed conveying reach 16 of an endless belt conveyor is positioned in generally parallel relation to the side frame members 12 and 14 and is supported by idler roller assemblies 10.

The shaft member of the idler roller assembly 10 is divided into shaft member end sections 18 and 20, and a shaft member center section 22. The end sections 18 and 20 and the center section 22 of the shaft member are joined by hinges indicated generally at 24. The division of the shaft member into three sections is by way of example only, and it will be appreciated that the shaft member could be divided into a greater number of sections or a lesser number as the individual requirements of the particular conveyor system dictate.

Each of the hinges 24 are formed with a pair of angled hinge arms 26 secured to the shaft member end sections 18 or 20. The angled arms 26 are best seen in FIGURE 2 and may be either formed integrally with the shaft member end sections 18 or 20 or may be affixed thereto as by welding. The shaft member center section 22 has a hinge arm 28 secured to each of its ends. The hinge arm 28 may be secured to the shaft member center section as by welding or it may be formed integrally therewith.

Each of the hinge arms 26 and 28 has an enlarged portion 30 formed at its end. The enlarged portions 30 are bored to receive a hinge pin 32 that is disposed transversely of the shaft member.

A pad 34 preferably formed of a deformable resilient substance such as rubber, may be secured to the ends of the end sections 18 and 20 and the center section 22 to provide a resilient cushion when the ends of the respective shaft member sections contact each other. The pad 34 is not a critical portion of the present invention and may be omitted if desired. Its function will become apparent as this description proceeds.

A rigid cylindrical roller member 38 is rotatably mounted on each of the shaft member sections 18, 20, and 22, and supported thereby. The rigid cylindrical roller members support the troughed conveying reach of the endless belt conveyor.

With the foregoing arrangement of the components of the idler roller assembly in mind, the operation of the idler roller assembly of FIGURES 1–3 in a flexible side frame supported conveyor may be considered. The individual sections 18, 20 and 22 of the shaft member of the idler roller assembly are connected by hinge pins 32. As clearly shown in FIGURE 1, the hinge pins 32, about which the sections pivot relative to each other, are offset from and disposed below the longitudinal axes of the individual shaft sections 18, 20 and 22. The shaft member end sections 18 and 20 have clamps 36 secured to their outer end portions to clamp the idler roller assembly 10 between the flexible side frame members 12 and 14.

With such a construction, the individual shaft sections may move relative to each other to vary the depth of the trough of the belt conveying reach 16. However, the depth of the belt conveying reach trough may not exceed a predetermined maximum. The maximum depth of the belt conveying reach trough is determined by the angles at which the hinge arms 26 and 28 are set relative to the end sections 18 and 20 and the center section 22 respectively.

FIGURES 1 and 3 illustrate the relative positions of the shaft sections and cylindrical rollers 38 under two belt loading conditions. In FIGURE 1, the belt conveying reach is relatively lightly loaded. The tension in the flexible side frame members 12 and 14 is sufficient to exert tension on the idler roller assembly 10. This tension maintains the idler roller assembly 10 in suspension between the flexible side frame members 12 and 14. The trough of the belt conveying reach 16 is relatively shallow, and the pads 34 on the ends of the shaft end sections 18 and 20 and the shaft center section 22 are maintained out of contact with each other by the tension exerted on the idler roller assembly 10.

In FIGURE 3 the solid lines of the shaft sections 20 and 22 and the cylindrical roller members 38 represent the relative positions of these components when the conveying reach is relatively lightly loaded as shown in FIGURE 1. The phantom line positions of shaft 20 and cylindrical member 38, represented by the reference numerals 20' and 38' respectively, show the position of the shaft section 20' and roller member 38' when the belt conveying reach is heavily loaded. When the belt conveying reach is heavily loaded, a downward force is exerted on the idler roller assembly 10. This downward force tends to pull the flexible side frame members 12 and 14 toward each other. As the flexible side frame members 12 and 14 are drawn toward each other, the trough of the conveying reach 16 begins to deepen.

As the trough of the conveying reach 16 deepens, the shaft member sections 18, 20, and 22 move about the hinge pins 32 and begin to close. The resilient pads 34 come into contact with each other. When the resilient pads 34 contact each other, the inward movement of flexible side frame members 12 and 14 is inhibited because the shaft member now resists further closing of hinges 24.

The phantom line positions of the shaft end section 20' and the cylindrical roller member 38' of FIGURE 3 represents the relative positions of the shaft sections and cylindrical rollers when the belt conveying reach trough is at a maximum depth. It will be appreciated that the embodiment of FIGURES 1–3 provides an idler roller assembly which has the advantages of a flexible shafted idler roller and which, at the same time, prevents the excessive troughing of the belt conveying reach that is a major drawback of flexible shafted conveyor assemblies when utilized with flexible side frame supported belt conveyor systems.

When the conveyor belt is loaded under normal conditions, the flexible side frame members 12 and 14 are maintained apart and the depth of the trough of the conveying reach 16 may vary according to the load on the conveying reach. If the conveying reach is lightly loaded, the hinge pins 32 allow hinges 24 to open to permit movement of the shaft member sections 18, 20 and 22 relative to each other. The cylindrical roller members 38 may then follow the belt conveying reach as it tends to flatten. Thus, the cylindrical roller members 38 remain in contact with the lightly loaded belt conveying reach throughout its width. When the conveying reach of the belt becomes excessively loaded, the flexible side frame members 12 and 14 move toward each other until they are at a minimum distance apart. At that time the resilient pads 34 on the ends of the individual shaft member sections contact each other and inhibit further movement of the flexible side frame members 12 and 14 toward each other.

As previously stated, the resilient pads 34 are not essential features of the present invention. They may be dispensed with and the metal shaft member sections may directly abut each other. The shaft member sections will provide a rigid member between the side frame members 12 and 14 and limit movement of the side frame members toward each other when the conveying reach trough is extended to its maximum depth.

According to the provisions of the patent statutes, I have explained the principle, preferred construction and mode of operation of my invention and have described what I now consider to represent its best embodiment. However, I desire to have it understood that, within the scope of the appended claims, the invention may be practiced otherwise than as specifically illustrated and described.

I claim:

1. A troughing idler roller assembly comprising a shaft member transversely spanning a pair of longitudinally extending, spaced flexible side frame members, said shaft member having end portions secured to each of said side frame members, said shaft member including a plurality of elongated rigid shaft sections disposed in end to end relation, a plurality of hinge arms rigidly secured to each of said shaft sections and extending downwardly therefrom, and a plurality of hinge pins pivotally connecting said hinge arms of adjacent shaft sections to form hinge connections therebetween, said hinge pins being disposed below said shaft sections, said hinge connections arranged to be open when said shaft sections are axially aligned, said hinge connections arranged to close to thereby permit deepening of said idler roller trough by permitting said side frame members to be drawn toward each other, a plurality of roller members rotatably supported by said shaft sections, said shaft sections arranged to abut each other upon closing of said hinge connections to limit the depth of said idler roller trough by inhibiting the movement of said side frame members toward each other at a minimum distance from each other.

2. A troughing idler roller assembly comprising a shaft member transversely spanning a pair of longitudinally extending, spaced flexible side frame members, said shaft member having end portions secured to each of said side frame members, said shaft member including a plurality of elongated, rigid shaft sections disposed in end to end relations, said shaft sections each having end portions and at least one inclined end wall with a resilient, deformable pad fixed to said inclined end wall, a plurality of hinge arms rigidly secured to said shaft section end portions and extending downwardly therefrom, and a plurality of hinge pins pivotally connecting said hinge arms of adjacent shaft section end portions to form hinge connections between said shaft sections, said hinge connections arranged to be open when said shaft sections are axially aligned, said hinge connections arranged to close to thereby permit deepening of said idler roller trough by permitting said side frame members to be drawn toward each other, a plurality of roller members rotatably supported by said shaft sections, said deformable pads on adjacent shaft sections arranged to abut each other upon closing of said hinge connections to limit the depth of said idler roller trough by inhibiting the movement of said side frame members toward each other at a minimum distance from each other.

3. A troughing idler roller assembly comprising a shaft member transversely spanning a pair of longitudinally extending, spaced flexible side frame members, said shaft member having end portions secured to each of said side frame members, said shaft member including a plurality of elongated, rigid shaft sections disposed in end to end relation, said shaft sections each having end portions including at least one inclined end wall, a plurality of hinge arms rigidly secured to said shaft section end portions and extending downwardly therefrom parallel to said respective shaft inclined end walls, a plurality of hinge pins pivotally connecting the hinge arms of adjacent shaft sections to each other to form hinge connections between said shaft sections, said respective shaft section inclined end walls being spaced from adjacent shaft section inclined end walls when said rigid shaft sections are axially aligned, said hinge connections arranged to close to thereby permit deepening of said idler roller trough by permitting said side frame members to be drawn toward each other, a plurality of rollers members rotatably supported on said shaft sections, said inclined end walls on adjacent shaft sections being arranged to abut each other upon closing of said hinge connections to limit the depth of said idler roller trough by preventing further movement of said side frame members toward each other beyond a predetermined minimum distance of said side frame members from each other.

References Cited in the file of this patent

UNITED STATES PATENTS

| | | |
|---|---|---|
| 754,335 | McCabe | Mar. 8, 1904 |
| 2,619,221 | Madeira | Nov. 25, 1952 |
| 2,885,066 | Lo Presti | May 5, 1959 |
| 2,889,918 | Bergman | June 9, 1959 |
| 2,892,533 | Lo Presti et al. | June 30, 1959 |
| 2,966,255 | Gleeson | Dec. 27, 1960 |